(12) United States Patent
Azuma

(10) Patent No.: US 9,098,750 B2
(45) Date of Patent: Aug. 4, 2015

(54) GRADIENT ESTIMATION APPARATUS, GRADIENT ESTIMATION METHOD, AND GRADIENT ESTIMATION PROGRAM

(71) Applicant: Honda elesys Co., Ltd., Yokohama-shi, Kanagawa-ken (JP)

(72) Inventor: Takahiro Azuma, Yokohama (JP)

(73) Assignee: Honda Elesys Co., Ltd., Kanagawa (JP)

( * ) Notice: Subject to any disclaimer, the term of this patent is extended or adjusted under 35 U.S.C. 154(b) by 67 days.

(21) Appl. No.: 13/666,657

(22) Filed: Nov. 1, 2012

(65) Prior Publication Data

US 2013/0182896 A1 Jul. 18, 2013

(30) Foreign Application Priority Data

Nov. 2, 2011 (JP) .................................. 2011-241465

(51) Int. Cl.
*G06K 9/00* (2006.01)

(52) U.S. Cl.
CPC ........ *G06K 9/00791* (2013.01); *G06K 9/00805* (2013.01)

(58) Field of Classification Search
CPC ........... G06K 9/00791; G06K 9/00798; B60T 2201/089; G06T 7/0042; G06T 7/2066; G06T 2207/20068
See application file for complete search history.

(56) References Cited

U.S. PATENT DOCUMENTS

| | | | |
|---|---|---|---|
| 6,535,114 B1* | 3/2003 | Suzuki et al. | 340/435 |
| 6,963,657 B1* | 11/2005 | Nishigaki et al. | 382/106 |
| 7,840,026 B2* | 11/2010 | Nishiuchi | 382/100 |
| 2006/0078165 A1* | 4/2006 | Watanabe | 382/107 |
| 2006/0256198 A1* | 11/2006 | Nishiuchi | 348/148 |
| 2007/0127778 A1* | 6/2007 | Fujimoto | 382/104 |
| 2008/0199050 A1* | 8/2008 | Koitabashi | 382/107 |
| 2009/0041337 A1* | 2/2009 | Nakano | 382/154 |
| 2010/0202661 A1* | 8/2010 | Mizutani | 382/103 |
| 2012/0170808 A1* | 7/2012 | Ogata et al. | 382/103 |

FOREIGN PATENT DOCUMENTS

JP 2008-033781 A 2/2008

OTHER PUBLICATIONS

Betke et al., Real-time multiple vehicle detection and tracking from a moving vehicle, Feb. 2000,Machine Vision and Applications (2000) 12, pp. 69-83.*
Horn et al., Determining Constant Optical Flow, 2003, Massachusetts Institute of Technology, pp. 1-11.*

(Continued)

*Primary Examiner* — Vu Le
*Assistant Examiner* — Guillermo Rivera-Martinez
(74) *Attorney, Agent, or Firm* — Keating & Bennett, LLP

(57) ABSTRACT

A gradient estimation apparatus includes a feature point extracting unit configured to extract feature points on an image captured by an imaging unit, an object detecting unit configured to detect image regions indicating objects from the image captured by the imaging unit, and a gradient calculating unit configured to calculate a gradient of the road surface on which the objects are located, based on the coordinates of the feature points extracted by the feature point extracting unit in the image regions indicating the objects detected by the object detecting unit and the amounts of movements of the coordinates of the feature points over a predetermined time.

11 Claims, 6 Drawing Sheets

(56) References Cited

OTHER PUBLICATIONS

Fleet et al., Optical Flow Estimation, 2005, Appears in "Mathematical Models in Computer Vision: The Handbook," N. Paragios, Y. Chen, and O. Faugeras (editors), Chapter 15, Springer, 2005, pp. 239-258.*

Horn et al., Time to Contact Relative to a Planar Surface, 2007, Proceedings of the 2007 IEEE Intelligent Vehicles Symposium Istanbul, pp. 68-74.*

C.Harris et al., "A Combined Corner and Edge Detector", Proc. 4th Alvey Vision Conf., pp. 147-151, Aug. 1988, Manchester, United Kingdom.

* cited by examiner

US 9,098,750 B2

GRADIENT ESTIMATION APPARATUS, GRADIENT ESTIMATION METHOD, AND GRADIENT ESTIMATION PROGRAM

CROSS REFERENCE TO RELATED APPLICATIONS

Priority is claimed on Japanese Patent Application No. 2011-241465, filed on Nov. 2, 2011, the contents of which are entirely incorporated herein by reference.

BACKGROUND OF THE INVENTION

1. Field of the Invention

The present invention relates to a gradient estimation apparatus, a gradient estimation method and a gradient estimation program.

2. Related Art

Techniques have been proposed that provide information about the surroundings of a vehicle to a driver for safe driving of the vehicle. There is a technique that calculates the gradient of a road surface, which is a kind of the information about surroundings of a vehicle, based on coordinates of point features of stationary objects photographed by a camera, or based on the width of the spacing between the lane mark lines drawn on the road surface.

For example, a road surface gradient detection apparatus disclosed in JP-A-2008-33781 includes imaging means for imaging a road surface, correlation detection means for detecting the correlation between a plurality of captured images of an arbitrary region captured at different imaging time instants, and gradient detection means for detecting the gradient of the road surface based on the correlation detected by the correlation detection means.

SUMMARY OF THE INVENTION

However, in the road surface gradient detection apparatus disclosed in JP-A-2008-33781, in a case where some or the entire road surface is occluded by different objects (for example, preceding vehicles), and it is thus difficult to calculate the gradient of the road surface.

The present invention was conceived of in view of the above points, and provides a gradient estimation apparatus, a gradient estimation method and a gradient estimation program that are capable of calculating the gradient of a road surface even when the road surface is covered by other objects.

(1) The present invention was conceived of in order to solve the above problem, and the first aspect of the invention is a gradient estimation apparatus including: a feature point extracting unit configured to extract feature points on an image captured by an imaging unit; an object detecting unit configured to detect image potions indicating objects presence from the image captured by the imaging unit; and a gradient calculating unit configured to calculate the gradient of a road surface on which the objects are located, based on coordinates of the feature points extracted by the feature point extracting unit in the image indicating the objects detected by the object detecting unit and the amount of movement in the coordinates of the feature points over a predetermined time.

(2) According to another aspect of the invention, in the gradient estimation apparatus according to (1), the gradient calculating unit divides the sum of differences in coordinate change ratios over combinations of discrete two feature point pairs, where a coordinate change ratio indicating the ratio of the coordinates of the feature points extracted by the feature point extracting unit in the image regions indicating the objects detected by the object detecting unit and the amounts of movement in the coordinates of the feature points over the predetermined time, by the sum of the differences of the inverse numbers of the amounts of movements over combinations of discrete two feature points, to calculate the gradient.

(3) According to another aspect of the invention, in the gradient estimation apparatus according to (1), the object detecting unit detects objects of which the relative velocities with respect to a host vehicle is smaller than a predetermined velocity.

(4) According to another aspect of the invention, in the gradient estimation apparatus according to (2), the gradient calculating unit selects a set of feature points in which an absolute value of the difference between the coordinates of two feature points is larger than a predetermined threshold value.

(5) An aspect of the invention is a gradient estimation method in a gradient calculation apparatus, including: extracting feature points on an image captured by an imaging unit, in the gradient calculation apparatus; detecting image regions indicating objects from the image captured by the imaging unit, in the gradient calculation apparatus; and calculating the gradient of a road surface on which the objects are located, based on the coordinates of the extracted feature points in the image regions indicating the detected objects and the amounts of movements in the coordinates of the feature points over a predetermined time, in the gradient calculation apparatus.

(6) An aspect of the invention is a gradient estimation program that causes a computer of a gradient calculation apparatus to execute a routine including: extracting feature points on an image captured by an imaging unit, in the gradient calculation apparatus; detecting an image indicating an object from the image captured by the imaging unit, in the gradient calculation apparatus; and calculating the gradient of a road surface on which the objects are located, based on the coordinates of the extracted feature points in the image regions indicating the detected objects and the amount of movement of the coordinates of the feature points over a predetermined time, by the gradient calculation apparatus.

According to the invention, it is possible to calculate the gradient of a road surface even though the road surface is covered by other objects.

DETAILED DESCRIPTION OF THE INVENTION

Hereinafter, embodiments of the present invention will be described with reference to the accompanying drawings.

Figure 1:
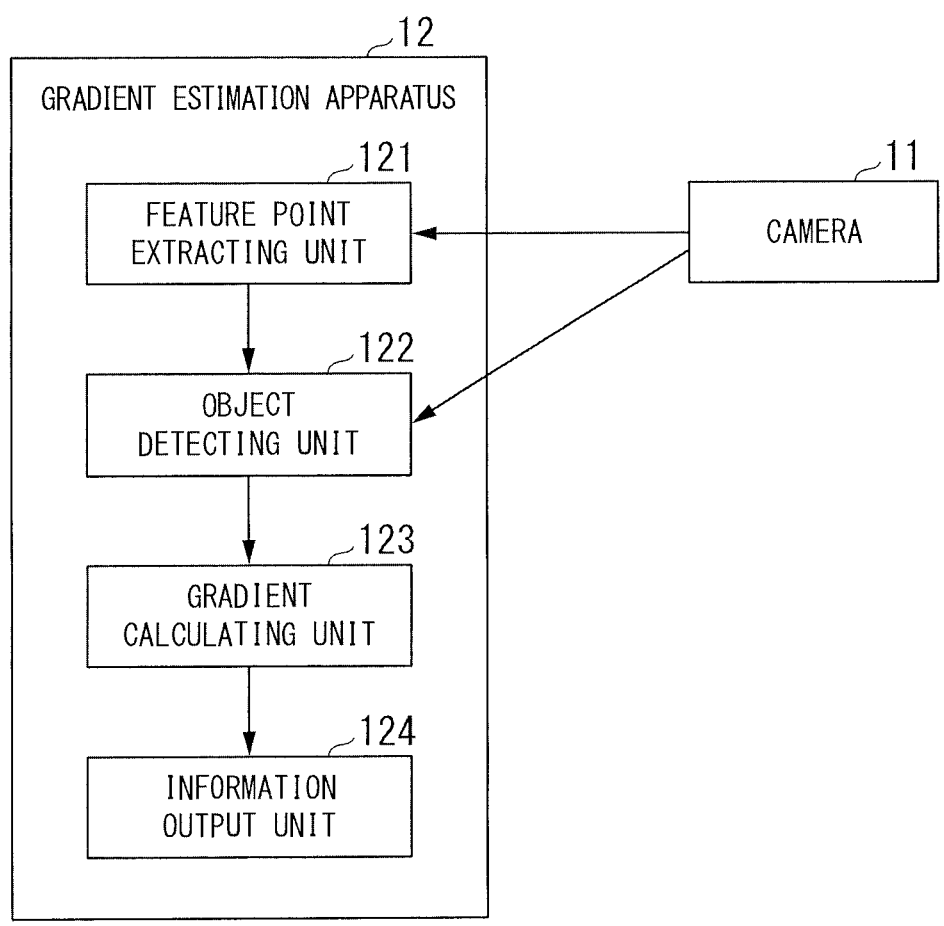
FIG. 1 is a diagram schematically illustrating a configuration of a gradient estimation apparatus 12 according to an embodiment of the invention.

FIG. 1 is a diagram schematically illustrating a configuration of a gradient estimation apparatus 12 according to the present embodiment.

The gradient estimation apparatus 12 according to the present embodiment includes a feature point extracting unit 121, an object detecting unit 122, a gradient calculating unit 123, and an information output unit 124.

That is, the gradient estimation apparatus 12 includes the feature point extracting unit 121 that extracts a feature point on an image captured by a camera 1 (imaging unit), the object detecting unit 122 that detects an image indicating an object from the image captured by the camera 1, and the gradient calculating unit 123 that calculates the gradient of a road surface where the objects are positioned based on coordinates of the feature points extracted by the feature point extracting unit 1 in the image regions indicating the objects detected by the object detecting unit 122 and the amount of movement of the coordinates of the feature point over a predetermined time.

Here, the object detecting unit 122 may detect objects of which the relative velocities with respect to the object detecting unit 122 is smaller than a predetermined velocity.

The gradient calculating unit 123 divides the sum of the differences in coordinate change ratios over combinations of discrete two feature points, where a coordinate change ratio indicating the ratio of coordinates of the feature points extracted by the feature point extracting unit 121 in the image regions indicating the objects detected by the object detecting unit 122 and the amounts of movement in the coordinates of the feature points over a predetermined time, by the sum of the differences of the inverse numbers of the amounts of movements over the combinations of two discrete feature points, to calculate the gradient.

Furthermore, the gradient calculating unit 123 selects a set of feature points in which an absolute value of a difference between the coordinates of two feature points is larger than a predetermined threshold value.

Hereinafter, a process in each component will be described.

The camera 11 captures an image of a peripheral scene of a vehicle, for example, a scene in front of the vehicle to generate an image signal, and outputs the generated image signal to the feature point extracting unit 121 of the gradient estimation apparatus 12. The camera 11 is, for example, a vehicle-mounted video camera that is installed so that the direction of an optical axis is directed to the scene in front of the vehicle.

The feature point extracting unit 121 receives an input of the image signal from the camera 11 at a predetermined time interval (for example, 1/30 second) for each frame. Here, the "frame" is a unit of an image signal indicating a single image. A luminance value for each pixel is included in an image signal of one frame.

The feature point extracting unit 121 extracts feature points from the image signal input for each frame. The feature point represents a point in an image from which the object motion to the vicinity can be uniquely determined. The feature point corresponds to a luminance peak point or a outline corner point, for example. The feature point extracting unit 121 may extract the feature point using the Harris' method (reference: C. Harris and M. Stephans, "A combined corner and edge detector," Proc. 4$^{th}$ Alvey Vision Conf., pp. 147-151, Manchester, U.K., August 1988). In the case where the Harris method is used, the feature point extracting unit 121 calculates a Harris operator value Mc as an index value indicating the size of gradient in respective coordinates (i, j) of the image signal. The Harris operator Mc is expressed by Equation (1).

$$M = \det(A) - \kappa \cdot \mathrm{trace}^2(A) \qquad (1)$$

In Equation (1), "det(A)" represents the determinant of a matrix A. Furthermore, "trace(a)" represents the sum of the diagonal components of the matrix A. "κ" is a predetermined real number, for example, 0.04. The matrix A is the Harris matrix. Each component of the Harris matrix A is calculated according to Equation (2).

$$A = \sum_u \sum_v w(u, v) \begin{bmatrix} I_x^2 & I_x I_y \\ I_x I_y & I_y^2 \end{bmatrix} \qquad (2)$$

In Equation (2), w(u, v) represents a window function specifying the weight of coordinates that are shifted by (u, v) from the respective coordinates (i, j). $I_x$ is a differential value of luminance values at the coordinates (i+u, j+v) in the horizontal direction (x direction). The coordinates $I_y$ is a differential value of luminance values at the coordinates (i+u, j+v) in the vertical direction (y direction).

The feature point extracting unit 121 extracts a predetermined number (for example, 10) of coordinates based on the point where the calculated index value is the largest, as feature points. The feature point extracting unit 121 may extract coordinates in which the calculated index value is larger than a predetermined value, as the feature points.

The feature point extracting unit 121 outputs feature point information indicating the coordinates of the extracted feature points to the object detecting unit 122.

The object detecting unit 122 detects objects (for example, preceding vehicles or other obstacles) contained in the image signal input through the camera 11, and generates objects information indicating regions where the detected objects are located. Here, the object detecting unit 122 performs edge detection, for example, in order to generate the object information. In this case, the object detecting unit 122 spatially smoothes the input image signal and removes a component having a spatial frequency that is higher than a predetermined cut-off value. The objet detecting unit 122 calculates absolute values of gradients (horizontal direction and vertical direction) between adjacent pixels included in the smoothed image signal as index values, for each pixel. The object detecting unit 122 detects pixels where the calculated index values are larger than a predetermined threshold value as edges. The object detecting unit 122 determines a region that is surrounded by spatially adjacent edges among the detected edges as the image region indicating the object's presence, and generates information for identifying the object for each image region.

The object detecting unit 122 calculates an index value indicating the relative velocity of the object with respect to the camera 11, for each image region indicating the object. The object detecting unit 122 selects object information corresponding to an object in which the distance between the camera 11 and the object is almost constant. Here, the detecting unit 122 selects object information indicating an object in which the absolute value of the calculated index value is smaller than a predetermined threshold value ε, based on the feature point information input from the feature point extracting unit 121. The object detecting unit 122 calculates a specific relative velocity, for example, as the index value of the relative velocity. Here, the specific relative velocity represents a variable having the constant factor relationship with the relative velocity. The specific relative velocity is the time rate of change in visual object size, for example. A method of calculating the specific relative velocity will be described later. Furthermore, the selected object information corresponds to an image indicating a preceding vehicle that precedes a host vehicle mounted with the gradient estimation apparatus 12, for example.

The object detecting unit 122 extracts feature point information indicating feature points in the image of the object indicated by the selected object information, so that each feature point has a corresponding feature point in the image signal of the previous frame. In order to reliably extract the feature point information having the corresponding feature point in the image signal of the previous frame, the object detecting unit 122 may extract the feature point information only when the number of the objects indicated by the selected object information is larger than a predetermined threshold value m (for example, m=2). In a case where such feature point information is extracted in the above-mentioned relative velocity calculation process, the object detecting unit 122 may hold the extracted feature point information in the process. The feature point search process of extracting the feature point information having the correlation with the feature points in the image signal of the previous frame will be described later.

The object detecting unit 122 outputs the extracted feature point information and the generated object information to the gradient calculating unit 123. The gradient calculating unit 123 calculates a movement vector indicating a value obtained by subtracting the coordinates of each feature point in the current frame from the coordinates of the corresponding feature points in the previous frame, based on the feature point information input from the object detecting unit 122. An element value indicating a vertical component (y axis component) of the calculated movement vector is referred to as the amount of vertical movement. When the movement vector is calculated, the gradient calculating unit 123 may compensate a coordinate change caused by rotation of the camera 11 with respect to the coordinates of the feature points of either the previous frame or the current frame. In a case where the compensation is not performed, the gradient calculating unit 123 calculates the gradient only at the time of straight traveling (described later), and does not calculate the gradient at the time of left turning or right turning. The gradient calculating unit 123 determines, as the straight traveling, a state where it is determined that the rotational movement of the vehicle body is not present since an angular velocity measured by a gyrosensor mounted in the vehicle is smaller than a predetermined value. Alternatively, the gradient calculating unit 123 determines the straight traveling when movement vectors for a plurality of feature points are arranged in a radial direction from a vanishing point indicating the straight traveling direction of the vehicle. The gradient calculating unit 123 selects a set that includes two feature points included in a region occupied by an image of each single object indicated by the object information input from the object detecting unit 122, from among the feature points indicated by the feature point information in the current frame. The gradient calculating unit 123 may select only a set in which an absolute value of the vertical component of the coordinates between the feature points is larger than a predetermined threshold value, from among the sets that include two feature points included in the region occupied by the image of each single object. Thus, it is possible to reduce the influence due to the error of the coordinates of the feature point.

The gradient calculating unit 123 calculates the gradient "a" using Equation (3), for example, based on coordinate values $y_k$ and $y_j$ in the vertical direction and the amounts of movement $\Delta y_k$ and $\Delta y_j$ in the vertical direction in the feature points k and j of the selected set. Here, k and j are integers that are equal to or greater than 1 and smaller than $N_{obj}$ or $N_{obj}$. $N_{obj}$ represents the number of feature points included in a region occupied by an image of an object.

$$a = \sum_{k>j} \frac{y_k}{\Delta y_k} - \frac{y_j}{\Delta y_j} \bigg/ \sum_{k>j} \frac{1}{\Delta y_k} - \frac{1}{\Delta y_j} \qquad (3)$$

In Equation (3), $\Sigma_{k>j}$ represents the sum in sets of feature points in which k>j among the sets of feature points k and j included in the region occupied by the image of one object. Thus, by inverting the order of the feature points k and j while preventing overlapping of the sets of the feature points, it is possible to prevent the values from being offset.

The numerator on the right side in Equation (3) represents the sum of first differential values obtained by subtracting, from the ratio (coordinate change ratio) $yk/\Delta y_k$ of the coordinate value $y_k$ of one feature point that belongs to a certain set of feature points to the amount of movement $\Delta y_k$ thereof, the ratio $y_j/\Delta y_j$ of the coordinate value $y_j$ of the other feature point j to the amount of movement $\Delta y_j$ thereof, in the sets of feature points in the current frame. The denominator on the right side in Equation (3) represents the sum of second differential values obtained by subtracting, from an inverse number $1/\Delta y_k$ of the amount of movement $\Delta y_k$ of the coordinate value $y_k$ of one feature point that belongs to a certain set of feature points, an inverse number $1/\Delta y_j$ of the amount of movement $\Delta y_j$ of the coordinate value $y_j$ of the other feature point j, in the sets of feature points in the current frame That is, according to Equation (3), the gradient calculating unit 123 divides the sum of the first differential values in the sets of feature points by the sum of the second differential values in the sets of feature points, to thereby calculate the gradient "a". A principle of calculating the gradient "a" using Equation (3) will be described later.

The gradient calculating unit 123 outputs gradient information indicating the calculated gradient "a" to the information output unit 124.

The information output unit 124 outputs the gradient information input from the gradient calculating unit 123 to a storage unit (not shown) included in the gradient estimation apparatus 12 for storage. The information output unit 124 determines the state of an object indicated by information about an image captured by the camera 11 based on the input gradient information, and may output the determination result to the outside of the gradient estimation apparatus 12.

For example, the information output unit 124 may estimate, based on a coordinate value of an image indicated by a certain object in the vertical direction and the input gradient information, the distance to the object. Generally, as the distance to the object indicated by the information about the image captured by the vehicle-mounted camera is increased, the coordinate value in the vertical direction is increased, but at the same time, as the gradient of the road surface becomes steep, the coordinate value in the vertical direction is increased. Thus, if the distance to the object on the road surface having the gradient is estimated based on only the coordinate value in the vertical direction, a distance shorter than the actual distance may be estimated. The information output unit 124 is able to more accurately estimate the distance to the object in consideration of the above-mentioned gradient information. The information output unit 124 may present alarm information (for example, alarm sound) to a driver when the estimated distance is smaller than a predetermined threshold value. Thus, as the driver approaches the object, it is possible to attract the driver's attention, and thus, it is possible to secure safe driving.

Here, a gradient calculation process according to the present embodiment will be described.

Figure 2:
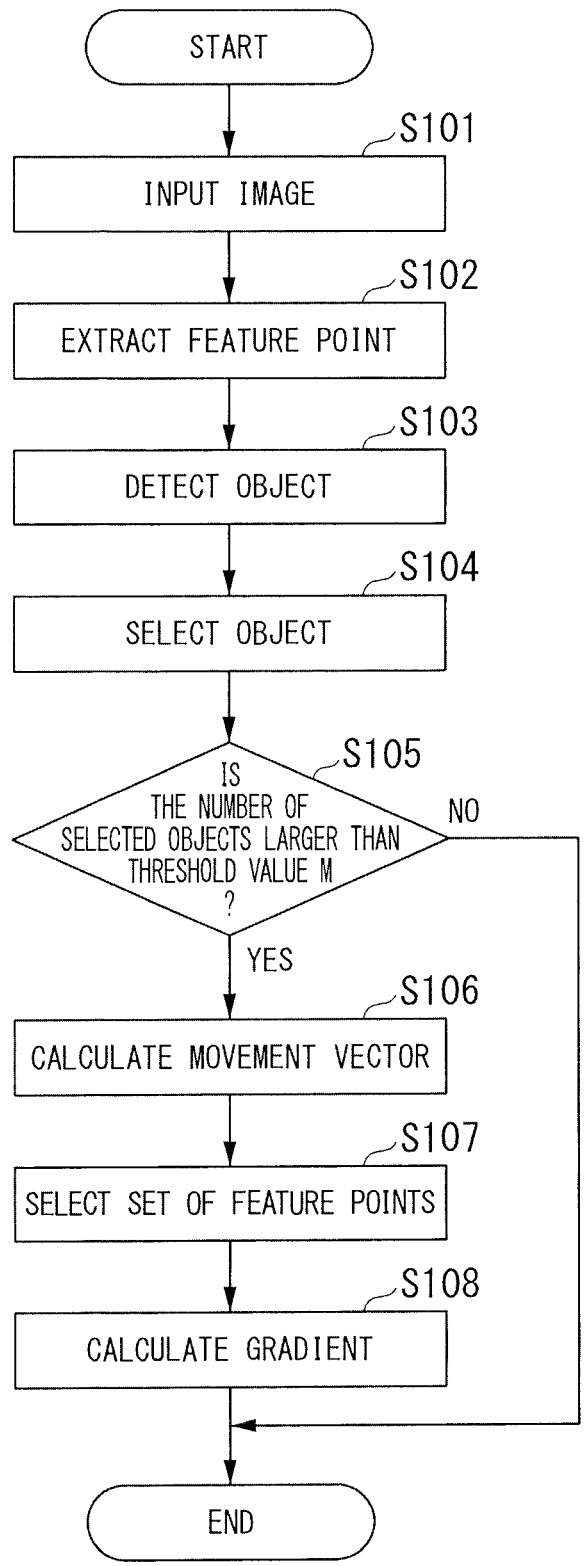
FIG. 2 is a flowchart illustrating an example of a gradient calculation process according to the present embodiment.

FIG. 2 is a flowchart illustrating an example of a gradient calculation process according to the present embodiment.

(Step S101) The feature point extracting unit 121 and the object detecting unit 122 receive an input of an image signal from the camera 11 for each frame at a predetermined interval. Then, the procedure goes to step S102.

(Step S102) The feature point extracting unit 121 extracts a feature point from the input image signal for each frame. The feature point extracting unit 121 outputs feature point information indicating coordinates of the extracted feature point to the object detecting unit 122. Then, the procedure goes to step S103.

(Step S103) The object detecting unit 122 detects an image of an object indicated by the input image signal, and generates object information indicating a region indicated by the detected image of the object. Then, the procedure goes to step S104.

(Step S104) The object detecting unit 122 calculates an index value indicating a relative velocity with respect to the camera 11 for each detected object. The object detecting unit 122 selects object information indicating an object in which an absolute value of the calculated index value is smaller than a predetermined threshold value ϵ, based on the input feature point information. Then, the procedure goes to step S105.

(Step S105) The object detecting unit 122 determines whether the total number of the objects indicated by the selected object information is larger than a predetermined threshold value m. In a case where the object detecting unit 122 determines that the total number of the objects indicated by the selected object information is larger than the predetermined threshold value m (Y in step S105), the procedure goes to step S106.

In a case where the object detecting unit 122 determines that the total number of the objects indicated by the selected object information is equal to or smaller than the predetermined threshold value m (N in step S105), the procedure ends.

(Step S106) The object detecting unit 122 extracts a feature point in the previous frame corresponding to the feature point in the current frame, that is a feature point on the image of the object indicated by the selected object information, based on the feature point information input from the feature point extracting unit 121. The object detecting unit 122 outputs information about the extracted feature point and the generated object information to the gradient calculating unit 123. Then, the procedure goes to step S107.

(Step S107) The gradient calculating unit 123 calculates a movement vector indicating the difference of coordinates from the feature point in the previous frame to the corresponding feature point in the current frame. The gradient calculating unit 123 selects sets that include two feature points included in a region of an image of each single object from the feature points indicated by the feature point information in the current frame. Then, the procedure goes to step S108.

(Step S108) The gradient calculating unit 123 calculates the gradient "a" using Equation (1), for example, based on the coordinate values in the vertical direction and the amounts of movement in the vertical direction in the feature points of each set included in the region of the image of the object. The gradient calculating unit 123 outputs gradient information indicating the calculated gradient "a" to the information input unit 124. Then, the procedure ends.

Next, a specific relative velocity calculation method according to the present embodiment will be described.

Figure 3:
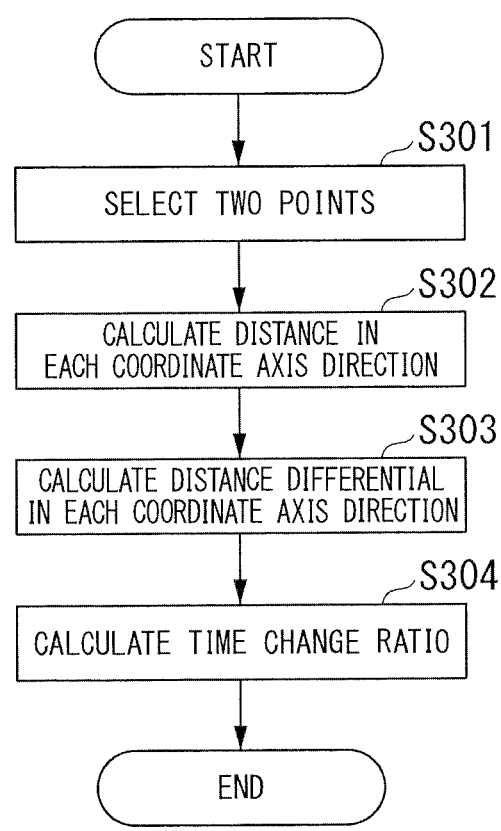
FIG. 3 is a flowchart illustrating an example of a specific relative velocity calculation method according to the present embodiment.

FIG. 3 is a flowchart illustrating an example of the specific relative velocity calculation method according to the present embodiment.

(Step S301) The object detecting unit 122 selects two points on the object for each detected object. The selected two points correspond to two among the above-mentioned extracted feature points, for example. Then, the procedure goes to step S302.

(Step S302) The object detecting unit 122 calculates distances $d_x$ and $d_y$ in respective coordinate axis directions (x axis (horizontal) direction or y axis (vertical) direction) between two selected points. Then, the procedure goes to step S303.

(Step S303) The object detecting unit 122 calculates differential values $d'_x$ and $d'_y$ relating to the calculated distances in the respective coordinate axis directions. Here, the object detecting unit 122 searches feature points in the previous frame t−1 corresponding to the feature points in the current frame t. A process of searching the feature points will be described later. The object detecting unit 112 divides distances $d_x(t-1)$ and $d_y(t-1)$ between the corresponding feature points in the previous frame t−1 from distances $d_x(t)$ and $d_y(t)$ in the current frame t by a time interval Δt between the respective frames, respectively, to calculate the differential values $d'_x$ and $d'_y$. Then, the procedure goes to step S304.

(Step S304) The object detecting unit 122 calculates values $d'_x/d_x(t)$ and $d'_y/d_y(t)$ obtained by respectively normalizing the calculated differential values (velocities) $d'_x$ and $d'_y$ of the distances in the respective coordinate axis directions with the distances $d_x(t)$ and $d_y(t)$ in the current frame t. The object detecting unit 122 calculates the average value of the calculated $d'_x/d_x(t)$ and $d'_y/d_y(t)$ as a specific relative velocity.

The specific relative velocity directly represents the time rate of change in the size of the object that is photographed by the camera 11, and also represents an index value indicating the relative velocity from the camera 11 to the object. Then, the procedure ends.

Next, in the present embodiment, a process of searching the feature points in the previous frame t−1 corresponding to the feature points in the current frame t, performed by the object detecting unit 122 will be described.

Figure 4:
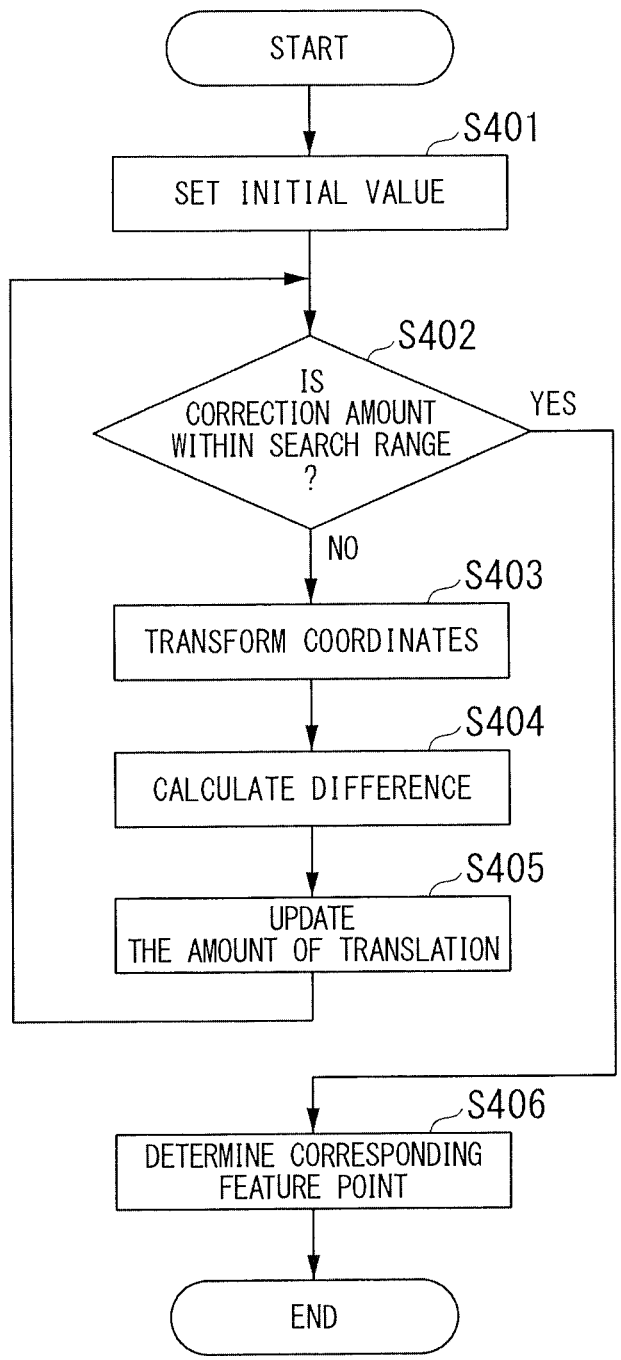
FIG. 4 is a flowchart illustrating a feature point search process according to the present embodiment.

FIG. 4 is a flowchart illustrating the feature point search process according to the present embodiment.

(Step S401) The object detecting unit 122 sets an initial value of the amount of translation, for each object, of each feature point from the previous frame t−1 to the current frame t to 0, for example. The object detecting unit 122 may set the initial value to the amount of translation that is previously calculated (the amount of translation between feature points from a frame t−2 to a frame t−1, for example), instead of 0. Furthermore, the object detecting unit 122 sets a range of searching the feature points of the previous frame t−1 from the feature points of the current frame t. Then, the procedure goes to step S402.

(Step S402) The object detecting unit 122 determines whether the amount of translation, for each object, of each feature point is in a set range of values. When the object detecting unit 122 determines that the amount of translation is in the set range of values (Y in step S402), the procedure goes to step S403. When the object detecting unit 122 determines that the amount of translation of each object is in the set range of values (N in step S402), the procedure goes to step S406.

(Step S403) The object detecting unit 122 adds the amount of translation of each object to the coordinates of the respective feature points of the previous frame t−1 to estimate the coordinates of the respective feature points of the current frame t. Then, the procedure goes to step S404.

(Step S404) The object detecting unit 122 calculates the difference between an interpolation pixel value of a sampling point that is present in an adjacent region (in the vicinity of the feature point) that is within a preset distance from the feature point in the current frame t estimated in step S403 and an interpolation pixel value of a sampling point that is in the vicinity of the feature point in the previous frame t−1, with respect to each sampling point. The sampling point of the previous frame t−1 represents a central point of respective pixels included in the vicinity of the feature point in the previous frame t−1, for example. The sampling point in the current frame t represents coordinates estimated by adding the amount of translation to the sampling point of the previous frame t−1. Since the feature point should not necessarily be present on the central point of the respective pixels, the object detecting unit 122 calculates the corresponding interpolation pixel value in each frame based on the positional relationship between the central point of the respective pixels that are present in the vicinity of the feature point and the feature point. Then, the procedure goes to step S405.

(Step S405) The object detecting unit 122 calculates the amount of translation that minimizes the sum of squares of the difference calculated in step S404, based on a nonlinear least-squares method, for example, to update the amount of translation. Then, the procedure goes to step S402.

(Step S406) The object detecting unit 122 determines feature points of the previous frame t−1 in which a square error based on the difference calculated in step S404 is minimum, as feature points of the previous frame t−1 respectively corresponding to the feature points of the current frame t.

Next, a principle in which the gradient calculating unit 123 calculates the gradient "a" using Equation (3) will be described.

Figure 5:
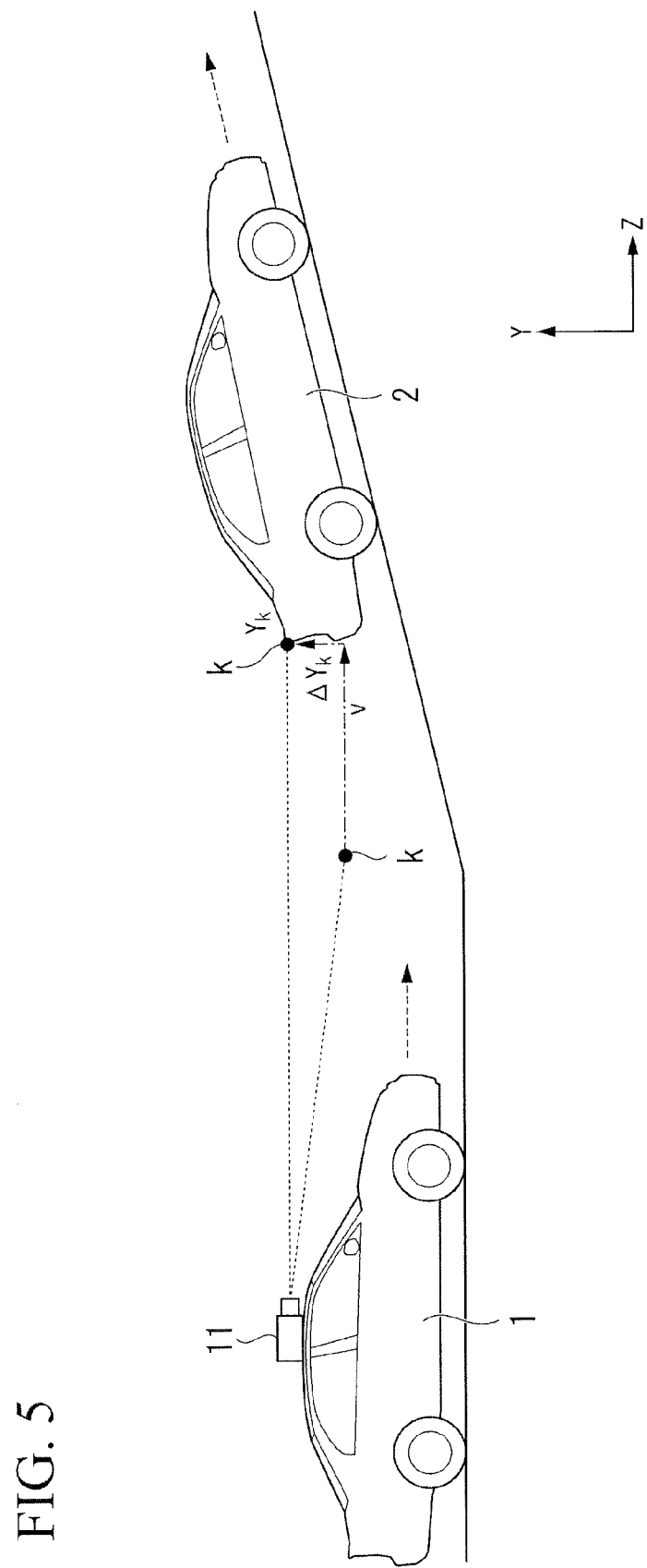
FIG. 5 is a conceptual diagram illustrating the positional relationship between a camera and an object according to the present embodiment.

FIG. 5 is a conceptual diagram illustrating the positional relationship between the camera 11 according to the present embodiment and a preceding vehicle 2 that is an object to be photographed (subject).

In FIG. 5, a vehicle on the left side is a host vehicle 1 that includes the camera 11, and a vehicle on the right side is the preceding vehicle 2 that is an object to be photographed by the camera 11. The Z axis represents an optical axis direction of the camera 11, and the Y axis represents a direction orthogonal to the optical axis direction of the camera 11.

Arrows shown on the right sides of the host vehicle 1 and the preceding vehicle 2 respectively represent a traveling direction of the host vehicle 1 and a signal direction of the preceding vehicle 2. Z axial components of the traveling direction of the host vehicle 1 and the traveling direction of the preceding vehicle 2 respectively represent a forward direction of the Z coordinate. Furthermore, the gradient of the road surface on which the preceding vehicle 2 travels is larger than the gradient of the road surface on which the host vehicle 1 travels.

The camera 11 captures an image indicating at least a part of a rear portion of the preceding vehicle 2. A black circle shown at the rear of the preceding vehicle 2 represents the position of a feature point k at the current frame time t. "$Y_k$" shown in the vicinity of the feature point k represents a coordinate value of the Y axial component at the feature point k. The black circle shown at the rear of the preceding vehicle 2 represents the position of the feature point k at the current frame time t−1. A dash-dotted line that extends from the black circle in the Z axis direction and vΔt represent that the feature point k is moved by the distance vΔt between the previous frame time t−1 and the current frame time t. Here, v represents a movement velocity, and Δt represents a frame time interval. A dash-dotted line that extends to the feature point from the terminal point of the former dash-dotted line, and $\Delta Y_k$ represent that the feature point k is moved by the distance $\Delta Y_k$ between the previous frame time t−1 and the current frame time t. That is, FIG. 5 shows a coordinate change of the feature point k in a world coordinate system.

Figure 6:
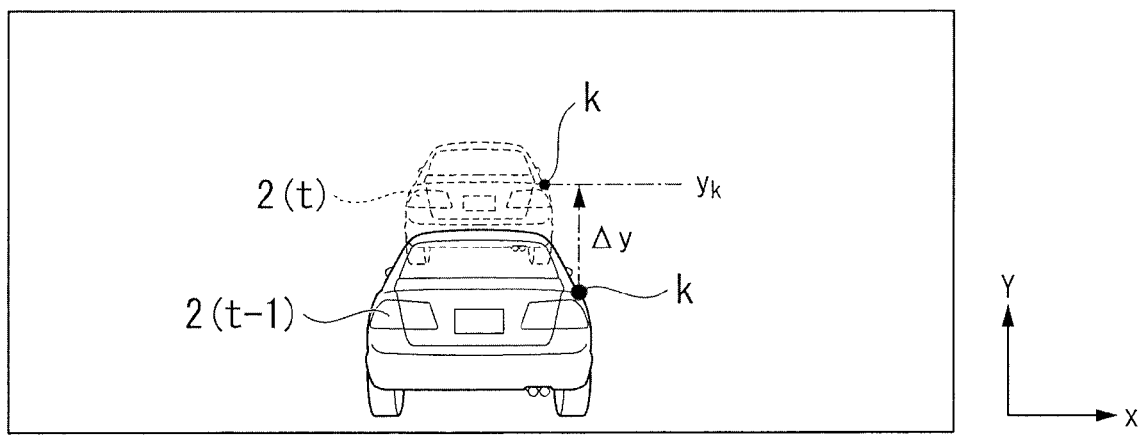
FIG. 6 is a conceptual diagram illustrating a position change of the object according to the present embodiment.

FIG. 6 is a conceptual diagram illustrating a position change of the preceding vehicle 2 that is a subject according to the present embodiment.

A central rectangular frame in FIG. 6 represents an external frame of each frame image captured by the camera 1.

In FIG. 6, the y axis represents a vertical direction that is in parallel with the Y axis in FIG. 5. The x axis represents a horizontal direction orthogonal to the y axis.

A central lower side in FIG. 6 represents an image indicating a rear portion of the preceding vehicle 2 (preceding vehicle 2 (t−1)) at the previous frame time t−1, and a black circle on the right side thereof represents a feature point k. The center of FIG. 6 represents an image indicating the rear portion of the preceding vehicle 2 (preceding vehicle 2(t)) at the current frame time t, and a black circle on the right side represents a feature point k. Here, "$y_k$" in the vicinity of the feature point k represents that a y coordinate of the feature point k at the current frame time t is $y_k$.

A dash-dotted line that extends from the feature point k in the y axis direction at the previous frame time t−1 and $\Delta y_k$ represent that the y coordinate of the feature point k is changed by $\Delta y_k$ between the previous frame time t−1 and the current frame time t. That is, FIG. 6 shows a coordinate change of the feature point k based on a camera coordinate system.

Here, the gradient that is the ratio of the amount of movement in the Y axis direction when the preceding vehicle 2 travels in the Z axis direction is represented as "a", and the distance from a lens of the camera 11 to an imaging surface is normalized as 1.

Here, the distance $\Delta Y_k$ where the feature point k moves in the Y axis direction between the frame time t−1 and the current frame time t and the change $\Delta y_k$ of the y coordinate have the relationship shown in Equation (4).

$$\Delta Y_k = \Delta y_k Z_k = av\Delta t \quad (4)$$

In Equation (4), $Z_k$ represents a coordinate value of the feature point k in the Z axis direction.

The coordinate value $Y_k$ of the feature point k in the Y axis direction at the current frame time t and the coordinate value $Z_k$ in the Z axis direction have the relationship shown in Equation (5).

$$Y_k = aZ_k - m + h_k \quad (5)$$

In Equation (5), m represents a segment of the Y coordinate that is common to all feature points k, and $h_k$ represents a segment of the Y coordinate with reference to m for each feature point k. Here, m is selected as shown in Equation (6).

$$m = \sum_{k=1}^{N_{obj}} (a - y_k) Z_k \bigg/ \sum_{k=1}^{N_{obj}} 1 \quad (6)$$

If the sum of the differences between Y coordinates $Y_j$ of feature points j and the Y coordinate $Y_k$ of the feature point k expressed by Equation (5) is united with Equation (6), the relationship shown in Equation (7) is obtained. Thus, the segments m and $h_k$ are offset.

$$\sum_{k>j}(Y_k - Y_j) = av\sum_{k>j}\left(\frac{y_k}{\Delta y_k} - \frac{y_j}{\Delta y_j}\right) \quad (7)$$

If Equation (4) is united with $\Delta y_k$ and the like on the right side in Equation (7), the relationship shown in Equation (3) is obtained.

That is, according to Equation (3), by dividing the sum of coordinate change ratios $y_k/\Delta y_k$ indicating the ratio of the coordinates $y_k$ in each set of feature points and the amounts of movement $\Delta y_k$ of the coordinates $y_k$ over a predetermined time $\Delta t$, in the sets relating to the differences $(y_k/\Delta y_k - y_j/\Delta y_k)$ between the feature points k and j, by the sum of inverse numbers $1/\Delta y_k$ of the amounts of movement $\Delta y_k$ in the sets relating to the differences $(1/\Delta y_k - 1/\Delta y_j)$ between the feature points k and j, it is possible to calculate the gradient "a".

In the above description, an example has been described in which the gradient calculating section 123 calculates the gradient "a" of the road surface on which the object (subject) at the current frame time is positioned (in a case where the object is a vehicle, traveling is also included) using the image signal of the current frame and the image signal of the previous frame captured in the past by $\Delta t$ (total two frames). However, the present embodiment is not limited thereto. For example, the average value (for example, movement mean value) of the gradient a(t) at the current frame time calculated by the gradient calculating section 123 and a gradient a(t−(M−1)$\Delta t$) at the time t−(M−1)$\Delta t$ that is previous by (M−1) $\Delta t$ may be calculated as a gradient a(t) at the current frame time t. Thus, concaves and convexes of the road surface on which the vehicle that includes the gradient estimation apparatus 12 is positioned or concaves and convexes of the road surface on which the object (subject) travels are smoothed, to thereby make it possible to calculate the gradient "a" with high accuracy.

In this manner, in the present embodiment, the object indicated by the image signal captured by an imaging unit is detected, the feature points on the detected object are extracted, the sets of the extracted feature points are determined, and the gradient of the road surface on which the object is positioned is calculated based on the coordinates of the feature points in each determined set and the amounts of movement of the coordinates over the predetermined time. Thus, even though the object is positioned on the road surface, it is possible to estimate the gradient of the road surface.

Furthermore, in the present embodiment, an object of which the relative velocity with respect to the host vehicle is lower than a predetermined velocity is detected. Thus, an object in which the distance to the host object is almost constant is detected, and thus, the positional relationship of the feature points on the object is almost constant. Thus, it is possible to reduce the amount of calculation, without complicated calculation of the gradient.

A part of the gradient estimation apparatus 12 in the above-described embodiment, for example, the feature point extracting unit 121, the object detecting unit 122, the gradient calculating unit 123 and the information output unit 124 may be realized by a computer. In this case, a program for realizing the control function may be recorded on a computer-readable recording medium, and the program recorded on the recording medium may be read by a computer system for execution. Here, the "computer system" may be a computer system built in the gradient estimation apparatus 12, and may include hardware such as an OS or peripherals. Furthermore, the "computer-readable recording medium" refers to a removable medium such as a flexible disk, a magneto-optical disc, a ROM or a CD-ROM, or a storage device such as a hard disk built in the computer system. Furthermore, the "computer-readable recording medium" may include a medium that dynamically stores a program for a short time, such as a communication cable in a case where the program is transmitted through a network such as the internet or a communication line such as a telephone line, or a medium that stores, in this case, the program for a specific time, such as a volatile memory inside a computer system including a server and a client. Furthermore, the program may be a program that realizes a part of the above-described functions, or may be a program that realizes the above-described functions by combination with a program that is recorded in advance in the computer system.

Furthermore, a part or all of the gradient estimation apparatus 12 according to the above-described embodiment may be realized as an integrated circuit such as an LSI (Large Scale Integrated) circuit.

The respective function blocks of the gradient estimation apparatus 12 may be individually realized as a processor, or a part or all thereof may be integrated into a processor. Furthermore, a method of implementing the integration circuit is not limited to the LSI, and may be realized as a dedicated circuit or a general purpose processor. Furthermore, in a case where an integration circuit technique as a replacement for the LSI appears according to technological advances, an integration circuit according to the technique may be used.

As described above, the embodiments of the invention have been described in detail with reference to the accompanying drawings, but a specific configuration is not limited to the above description, and various design changes may be made in a range without departing from the spirit of the invention.

What is claimed is:

1. A gradient estimation apparatus for a host vehicle comprising:
   a feature point extracting unit configured to extract feature points based on two images captured in a predetermined time interval by an imaging unit which is incorporated in the host vehicle;
   an object detecting unit configured to detect more than two image regions indicating distinct moving objects from the two images captured by the imaging unit; and
   a gradient calculating unit configured to calculate a gradient of a road surface on which the moving objects are located, based on coordinate values of the feature points extracted by the feature point extracting unit in the image regions and amounts of movement of the coordinate values of the feature points over the predetermined time interval, wherein
   the imaging unit includes a lens and an imaging surface, and converts the feature points into a normalized camera coordinate system on the imaging unit, where a distance from the lens and the imaging surface is normalized as 1,
   the gradient calculating unit calculates a gradient "α" using Equation (3), defined in the normalized camera coordinate system, based on more than two selected sets of two feature points which are selected differently from the more than two image regions and which have coordinate values Yk and Yj located along a vertical direction, and the amounts of movement $\Delta$Yk and $\Delta$Yj in the predetermined time interval in the vertical direction of the feature points k and j of the selected set, where k and j are integers that are equal to or greater than 1 and smaller than $N_{obj}$, $N_{obj}$ represents the number of the selected feature points, $$\alpha = \sum_{k>j} \frac{Yk}{\Delta Yk} - \frac{Yj}{\Delta Yj} \bigg/ \sum_{k>j} \frac{1}{\Delta Yk} - \frac{1}{\Delta Yj} \qquad \text{Equation (3)}$$

and in Equation (3), $\Sigma(k>j)$ represents the sum in the sets of the feature points in which k>j among the sets of the feature points k and j.

2. The gradient estimation apparatus according to claim 1, wherein the object detecting unit detects the moving objects of which relative velocities with respect to the host vehicle are smaller than a predetermined velocity.

3. The gradient estimation apparatus according to claim 1, wherein the gradient calculating unit selects a set of feature points in which an absolute value of the difference between coordinates of two feature points is larger than a predetermined threshold value.

4. A gradient estimation method for a host vehicle, based on two images captured in a predetermined time interval by an imaging, unit incorporated in the host vehicle, comprising:
  a feature points extracting process performed on the two images captured by the imaging unit;
  an object detecting process to detect more than two image regions indicating distinct moving objects from the two images captured by the imaging unit; and
  a gradient calculating process to calculate a gradient of a road surface on which the moving objects are located, based on coordinate values of the extracted feature points in the image regions indicating the detected moving objects and the amounts of movements of the coordinate values of the feature points over the predetermined time interval, wherein
  the imaging unit includes a lens and an imaging surface, and converts the feature points into a normalized camera coordinate system on the imaging unit, a distance from the lens and the imaging surface is normalized as 1,
  the gradient calculating process calculates a gradient "α" using Equation (3), defined in the normalized camera coordinate system, based on more than two selected sets of two feature points which are selected differently from the more than two image regions and which have coordinate values Yk and Yj located along a vertical direction, and the amounts of movement ΔYk and ΔYj in the predetermined time interval in the vertical direction of the feature points k and j of the selected set, where k and j are integers that are equal to or greater than 1 and smaller than $N_{obj}$, $N_{obj}$ represents the number of the selected feature points, $$\alpha = \sum_{k>j} \frac{Yk}{\Delta Yk} - \frac{Yj}{\Delta Yj} \bigg/ \sum_{k>j} \frac{1}{\Delta Yk} - \frac{1}{\Delta Yj} \qquad \text{Equation (3)}$$

and in Equation (3), $\Sigma(k>j)$ represents the sum in the sets of the feature points in which k>j among the sets of the feature points k and j.

5. A non-transitory computer readable medium having instructions stored thereon, which, when executed b a computer, cause the computer to perform a gradient estimation method for a host vehicle, based on two images captured in a predetermined time interval by an imaging unit incorporated in the host vehicle, comprising:
  a feature point extracting process performed on the two images captured by the imaging unit;
  an object detecting process to detect more than two image regions indicating distinct moving objects from the two images captured by the imaging unit; and
  a gradient calculating process to calculate a gradient of a road surface on which the moving objects are located, based on coordinate values of the extracted feature points in the image regions indicating the detected moving objects and the amounts of movement of the coordinate values of the feature points over the predetermined time interval, wherein
  the imaging unit includes a lens and an imaging surface, and converts the feature points into a normalized camera coordinate system on the imaging unit, a distance from the lens and the imaging, surface is normalized as 1,
  the gradient calculating process calculates the gradient "α" using Equation (3), defined in the normalized camera coordination system, based on more than two selected sets of two feature points which are selected differently from the more than two image regions and which have coordinate values Yk and Yj on a vertical direction, and the amounts of movement ΔYk and ΔYj in the predetermined time interval in the vertical direction of the feature points k and j of the selected set, where k and j are integers that are equal to or greater than 1 and smaller than $N_{obj}$, $N_{obj}$ represents the number of the selected feature points, $$\alpha = \sum_{k>j} \frac{Yk}{\Delta Yk} - \frac{Yj}{\Delta Yj} \bigg/ \sum_{k>j} \frac{1}{\Delta Yk} - \frac{1}{\Delta Yj} \qquad \text{Equation (3)}$$

and in Equation (3), $\Sigma(k>j)$ represents the sum in the sets of the feature points in which k>j among the sets of the feature points k and j.

6. The gradient estimation apparatus according to claim 2, wherein the gradient calculating unit selects a set of feature points in which an absolute value of a difference between the coordinate values of the set of feature points is larger than a predetermined threshold value.

7. The gradient estimation method according to claim 4, wherein the object detecting process detects the moving objects of which relative velocities with respect to the host vehicle are smaller than a predetermined velocity.

8. The gradient estimation method according to claim 4, wherein the gradient calculating process selects a set of feature points in which an absolute value of a difference between coordinates of two feature points is larger than a predetermined threshold value.

9. The gradient estimation method according to claim 7, wherein the gradient calculating process selects a set of feature points in which an absolute value of a difference between coordinate values of the set of feature points is larger than a predetermined threshold value.

10. The non-transitory computer readable medium having instructions stored thereon, which, when executed by a computer, cause the computer to perform the gradient estimation method according to claim 5, wherein the object detecting process detects the moving objects of which relative velocities with respect to the host vehicle are smaller than a predetermined velocity.

11. The non-transitory computer readable medium having instructions stored thereon, which, when executed by a computer, cause the computer to perform the gradient estimation method according to claim 5, wherein the gradient calculating process selects a set of feature points in which an absolute value of a difference between coordinates of two feature points is larger than a predetermined threshold value.

* * * * *